(No Model.) 2 Sheets—Sheet 1.
W. K. FREEMAN.
REGULATOR FOR ELECTRIC GENERATORS AND MOTORS.
No. 309,536. Patented Dec. 23, 1884.
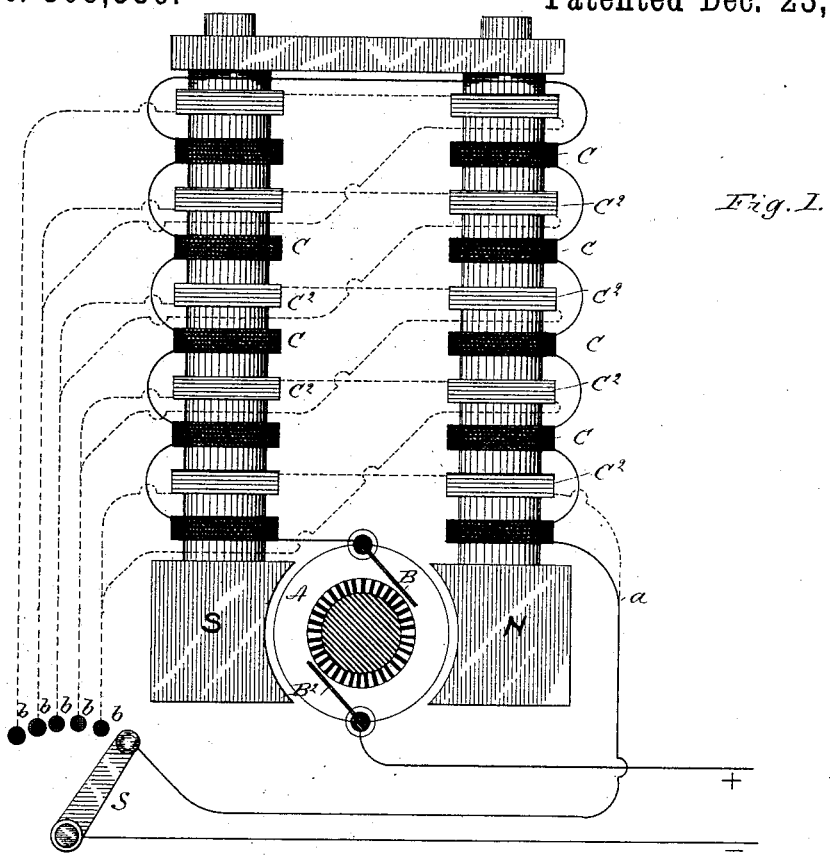
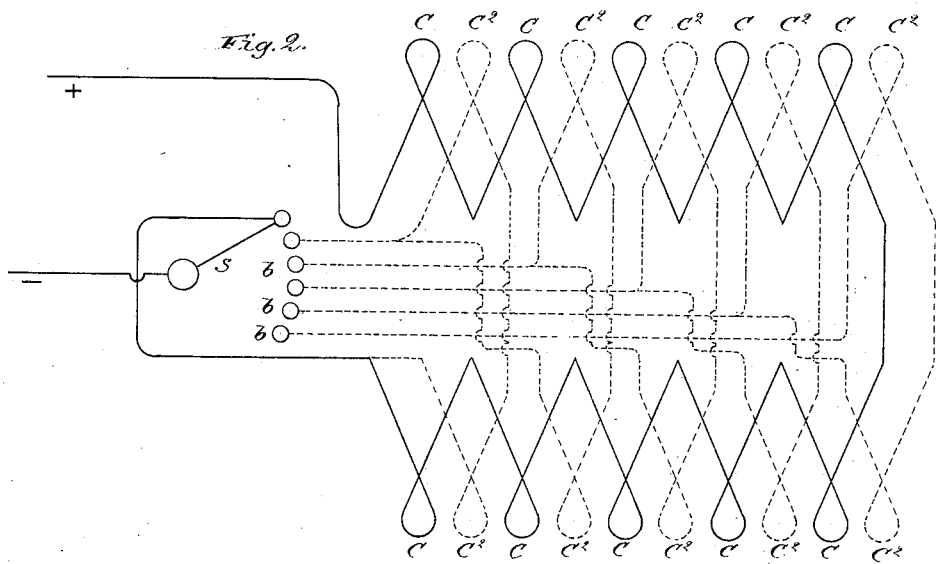
Witnesses:
Ernest Abshagen
Thos. Toomey
Inventor:
Walter K. Freeman
By his Atty: H. C. Townsend
N. PETERS. Photo-Lithographer, Washington, D. C.

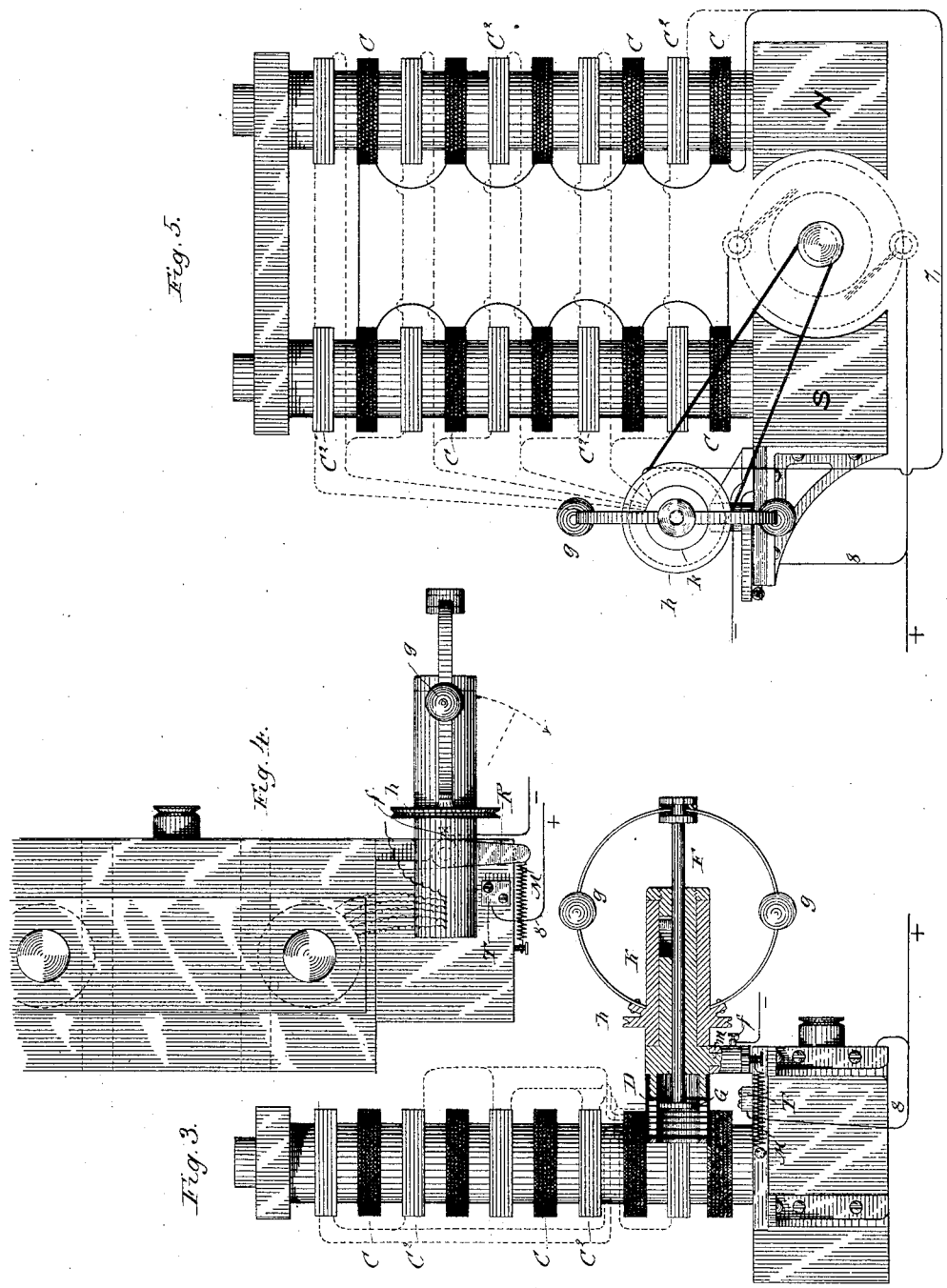

UNITED STATES PATENT OFFICE.

WALTER K. FREEMAN, OF BROOKLYN, NEW YORK, ASSIGNOR TO MONARCH ELECTRIC COMPANY, OF NEW YORK.

REGULATOR FOR ELECTRIC GENERATORS AND MOTORS.

SPECIFICATION forming part of Letters Patent No. 309,536, dated December 23, 1884.

Application filed March 24, 1884. (No model.)

*To all whom it may concern:*

Be it known that I, WALTER K. FREEMAN, a citizen of the United States, and a resident of Brooklyn, in the county of Kings and State of New York, have invented certain new and useful Improvements in Dynamo-Electric and Electro-Dynamic Machines, of which the following is a specification.

My invention relates to means for governing and regulating dynamo-electric and electro-dynamic machines, and is designed to furnish improved means for governing the strength of the field in which the armature of the machine revolves, for automatically regulating or controlling the speed of the machine when used as an electric motor, and likewise to provide a safety appliance for bringing the motor to rest in case of derangement or stoppage of the mechanism, whereby its speed is governed and kept within bounds.

The object of my invention is also to permit two or more electric motors to be safely and properly run upon the same circuit without interference with one another.

My invention consists in the novel arrangements and combinations, that will be herein described in connection with the accompanying drawings, and will be more specifically stated in the claims at the end of this specification.

In the accompanying drawings, Figure 1 is an elevation of the field-magnet of an electric motor or generator, showing applied thereto the system of coils and circuits whereby the strength of the field-magnet may be regulated. Fig. 2 is a diagram of the circuits shown in Fig. 1. Fig. 3 is an edge view of an electric motor, with a portion of the speed-governing device of my invention shown in vertical section. Fig. 4 is a plan of the apparatus shown in Fig. 3. Fig. 5 is a side elevation of the apparatus shown in Fig. 3.

Referring to Fig. 1, N S indicate the pole-pieces of a field-of-force magnet of any usual or proper construction as used with an electric motor or generator; A, the armature of the machine, and B B² the commutator-brushes by which current is conveyed to or from the armature-coils.

C C C indicate the usual or ordinary coils of wire upon the field-magnet, which coils are here shown as being in the same circuit with the armature, after the usual manner. The opposite poles of the machine-circuit are indicated by the signs + —, and the circuit is under ordinary conditions from — to and through the field-magnet coils to brush B, armature-brush B², and out at +.

C² C² indicate sets of opposing coils wound on the field-magnet, and connected with one terminal of the coils C at a point, as $a$. The circuit from $a$ through the coils C² to the negative side (—) of the machine-circuit is controlled by a switch, S, of any suitable or desired construction, that is adapted to be moved over a series of contacts, $b$, to which the terminals of the coils C² are connected in the manner indicated, the lower pair of coils C² in the same horizontal plane being connected to the first contact $b$ to the left of the switch in the position shown, and the other pairs to the remaining contacts in regular order. The coils C² are connected with one another in series, and from the connecting-wire between each two pairs a loop-connection is taken to a contact $b$. The terminal of the series C² is connected to the left-hand contact $b$. The coils C are connected in such way to the circuit as to tend to oppose the influence of the main or charging coils C, and are preferably of coarse wire of the same size as that used for coils C. They are also, preferably, the same in number or amount, so as to exert the same influence upon the field-magnet core, with the effect that if the switch S be on the left-hand stud or contact $b$, all of the coils C² will be in circuit with the coils C, and the strength of the field-magnetism will be *nil*. As the coils C² are to be used in series with the coils C no particular pains need be taken to balance or adjust their effects to one another, and as the coils C² are of coarse wire, their resistance, even when all are in circuit, is of no appreciable consequence. By turning the switch S the strength of the field-magnet may be gradually cut down as the number of opposing coils C² in circuit with coils C is increased, thus diminishing the electro-motive force of the machine if it be used as a generator, and its speed if it be used as a motor. The number of the coils C is the normal or maximum number employed for giving to the machine its normal or maximum capacity as a motor or a generator. The switch S normally, or when on the right-hand contact-stud, completes the circuit from the charging-coils directly to line, but if turned to the left breaks such connection and compels the current passing through the charging-coils to pass through one or more pairs of opposing coils $C^2$ before reaching line, thus cutting down the field-magnetism to an extent dependent on the number of coils $C^2$ in circuit.

The above method of regulating or determining the strength of the field-magnet may be conveniently combined with suitable speed mechanism to constitute a speed-governor for an electric motor, the action being in such case to keep the speed down when the strength of the current increases, by automatically introducing opposing coils $C^2$ in circuit. Such an arrangement is shown in Figs. 3, 4, and 5.

In place of the form of switch indicated in Fig. 1 I by preference employ a switch consisting of a cylinder, D, made up of a set of rings insulated from one another and properly secured together, and a contact-piston, G, moving in said cylinder and connected with the negative pole of the circuit in the same manner as the switch S, Fig. 1. The rings are connected in the same manner as the contacts $b$, Fig. 1, to the coils $C^2$, and to the terminal of the charging-coils C, the latter connection being made by a wire, 7, Fig. 5, that is connected to the inner or right-hand ring, against which latter the piston bears when the speed mechanism by which the switch is operated is out of action. Connection with the piston is made by a binding-post, $f$, in electrical connection with the metal frame or block in which rod F, supporting the piston, moves. The piston is operated by any suitable mechanism acting in accordance with variations in the speed of the motor to move the piston in one direction or the other, so as to increase or decrease the number of coils $C^2$ in circuit, according as the speed tends to increase or diminish by a rise or fall of the current strength in the circuit in which the motor is operated. A convenient mechanism for this purpose is a ball governor of any of the usual kinds employed with steam-engines.

In the drawings, F indicates the spindle, of a simple form, which spindle carries the piston G, and is connected to the spring-supports for the balls $g\ g$ of the speed mechanism.

The device is rotated by a belt connecting the wheel $h$ upon the sleeve $k$ with the shaft of the motor, as indicated in Fig. 5, with the obvious effect of pulling the spindle to the left as the speed rises.

The speed mechanism is set so that with a normal speed of rotation no movement of this kind will be produced, and the switch-piston will remain in contact with the ring connected by wire 7 directly with the terminal of the charging-coils. If, however, the speed increase, owing to increase in the driving-current, the spindle F will be drawn to the left, so as to introduce an opposing coil $C^2$ into circuit with coils C, thus cutting down the field-magnetism and compensating for the increase in the strength of the current.

In order to provide for the automatic shunting of the motor in case of breakage of the belt, which is applied to the pulley $h$, I pivot the frame carrying the working parts of the speed mechanism in any suitable manner, as at $m$, so that it may swing in a horizontal plane and in a direction to act upon or close suitable contacts, when it is not held by the belt in the position shown in the drawings. A spring, M, applied to an arm, R, serves to move the frame in the direction of the arrow, if the belt slip from its pulleys or break, and to thus bring the arm R against a suitable contact, T, thus closing a shunt-circuit around the machine. The arm R is of metal, and forms an extension from the sleeve upon which the binding-post $f$ is mounted, and is therefore in direct electrical connection with the negative pole of the circuit. The contact T is connected in any suitable manner, as by wire 8, with the positive pole, so that when T and R are in contact a cross or short circuit around the motor is formed. By this means the motor is brought to rest, and at the same time the circuit for other motors in series with the shunted motor is preserved.

What I claim as my invention is—

1. In an electric generator or motor, the combination, with the field-magnet charging coils, of a set of supplemental opposing coils normally out of circuit, and means for including said coils in series with the main or charging coils.

2. In an electric motor or generator, the combination, with the field-magnet, of a set of opposing coils and means for including a greater or less number of said coils in series with the main or charging coils, as and for the purpose described.

3. In an electric motor, the combination, with the field-magnet, of opposing or neutralizing coils and devices controlled by changes in the speed of the motor for varying the number of said coils that shall be at any time in action.

4. The combination, with an electric motor, of a set of opposing coils wound upon the field-magnet, a switch controlling the number of said coils that shall be in circuit, and devices responding to changes in the speed of the motor for acting on said switch, as and for the purpose described.

5. The combination, with an electric motor, of a set of field-magnet coils and devices acting in accordance with the speed of the motor to determine the number of said coils that shall be at any time in circuit.

6. The combination, with an electric motor, of a speed-governor and means controlled by the driving devices of the speed-governor for automatically closing a shunt in case the driving devices break while the motor is running.

7. The combination, with an electric motor, of a set of opposing coils wound on the field-magnet, speed mechanism controlling the circuits of said coils, and a shunting-switch, also controlled by the driving devices for the speed mechanism, and adapted to close a shunt to bring the motor to rest in case the driving devices cease to operate said speed mechanism.

8. The combination, with an electric generator or motor, of a set of field-magnet coils and a controlling-switch consisting of a cylinder built up of rings insulated from one another, and a circuit-closing piston moving in said cylinder.

9. The combination, with an electric motor, of devices for adjusting the strength of the field in which the armature moves, mechanism responsive to changes in the speed of the motor for controlling said adjusting devices, and a shunting-switch held open by the driving-belt for the speed mechanism.

Signed at New York, in the county of New York and State of New York, this 22d day of March, A. D. 1884.

WALTER K. FREEMAN.

Witnesses:
 THOS. TOOMEY,
 GEO. C. COFFIN.